United States Patent
Zou

(10) Patent No.: US 8,166,331 B2
(45) Date of Patent: Apr. 24, 2012

(54) COMPUTER SYSTEM AND OPERATING METHOD THEREOF

(75) Inventor: Hua Zou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 488 days.

(21) Appl. No.: 12/424,527

(22) Filed: Apr. 15, 2009

(65) Prior Publication Data

US 2010/0223485 A1    Sep. 2, 2010

(30) Foreign Application Priority Data

Mar. 2, 2009    (CN) .......................... 2009 1 0300631

(51) Int. Cl.
*G06F 1/26* (2006.01)
*G06F 1/18* (2006.01)
*G06F 1/24* (2006.01)
*G06F 15/177* (2006.01)

(52) U.S. Cl. ................ 713/330; 713/1; 713/2; 713/300; 713/310; 713/340; 327/143

(58) Field of Classification Search .................. 713/300, 713/310, 320–324, 330, 340, 1–2, 100; 361/89; 327/143

See application file for complete search history.

(56) References Cited

U.S. PATENT DOCUMENTS

| | | | |
|---|---|---|---|
| 5,224,010 A * | 6/1993 | Tran et al. ........................ | 361/90 |
| 6,333,650 B1 * | 12/2001 | Amin et al. ..................... | 327/143 |
| 6,792,553 B2 * | 9/2004 | Mar et al. ....................... | 713/330 |
| 6,988,214 B1 * | 1/2006 | Verdun ........................... | 713/320 |
| 2007/0079162 A1 * | 4/2007 | Mundada et al. ............. | 713/330 |
| 2007/0250721 A1 * | 10/2007 | Searles et al. ................. | 713/300 |

* cited by examiner

*Primary Examiner* — Kim Huynh
*Assistant Examiner* — Fahmida Rahman
(74) *Attorney, Agent, or Firm* — Altis Law Group, Inc.

(57) ABSTRACT

A computer system includes a power supply, a timing control circuit including a delay module, and a south bridge chip. The power supply outputs necessary voltages to the computer system and a first power good signal. The necessary voltages include a system voltage. The timing control circuit generates a second power good signal to the south bridge chip according to the first power good signal. The first power good signal is delayed a first time to be effective after voltages of the system voltage rise to a rated value. The second power good signal is generated after the first power good signal is delayed a second time by the delay module. The first power good signal indicates that the necessary voltages are ready in response to being effective. The second power good signal indicates that necessary input powers of the south bridge chip are ready in response to being effective.

12 Claims, 3 Drawing Sheets

COMPUTER SYSTEM AND OPERATING METHOD THEREOF

BACKGROUND

1. Technical Field

The present disclosure relates to computer systems, and more particularly to a computer system having an updated power supply sequence and a method for operating the computer system.

2. Description of Related Art

A power supply on (PS_ON) signal is a TTL-compatible (transistor-transistor logic compatible) signal that allows a motherboard of a computer system to remotely control a power supply in conjunction with features such as soft on/off. When the PS_ON signal is at a TTL low level, such as a logical 0, the power supply will turn on full power, such as a 5-volt system voltage (VCC5V), a 12-volt system voltage (VCC12V), a 3-volt system voltage (VCC3V), and a 5-volt standby voltage (5V_SB). When the PS_ON signal is at a TTL high level, such as a logical 1, the power supply turns off all of the voltages except the 5V_SB. Once the power supply voltages are stable, the power supply will signal that fact to the motherboard with a power good (PWR_GOOD) signal. When the PWR_GOOD signal is effective, a POWER_OK signal received by a south bridge chip of the computer system is effective to indicate that the powers supplied to the south bridge chip are stable, and the computer system should start an operating system.

According to new platform specifications from Intel, the POWER_OK signal of the south bridge chip should be delayed a predetermined time to be effective after the PWR_GOOD signal is effective. Ordinary computer timing can no longer meet this new requirement.

DETAILED DESCRIPTION

Figure 1:
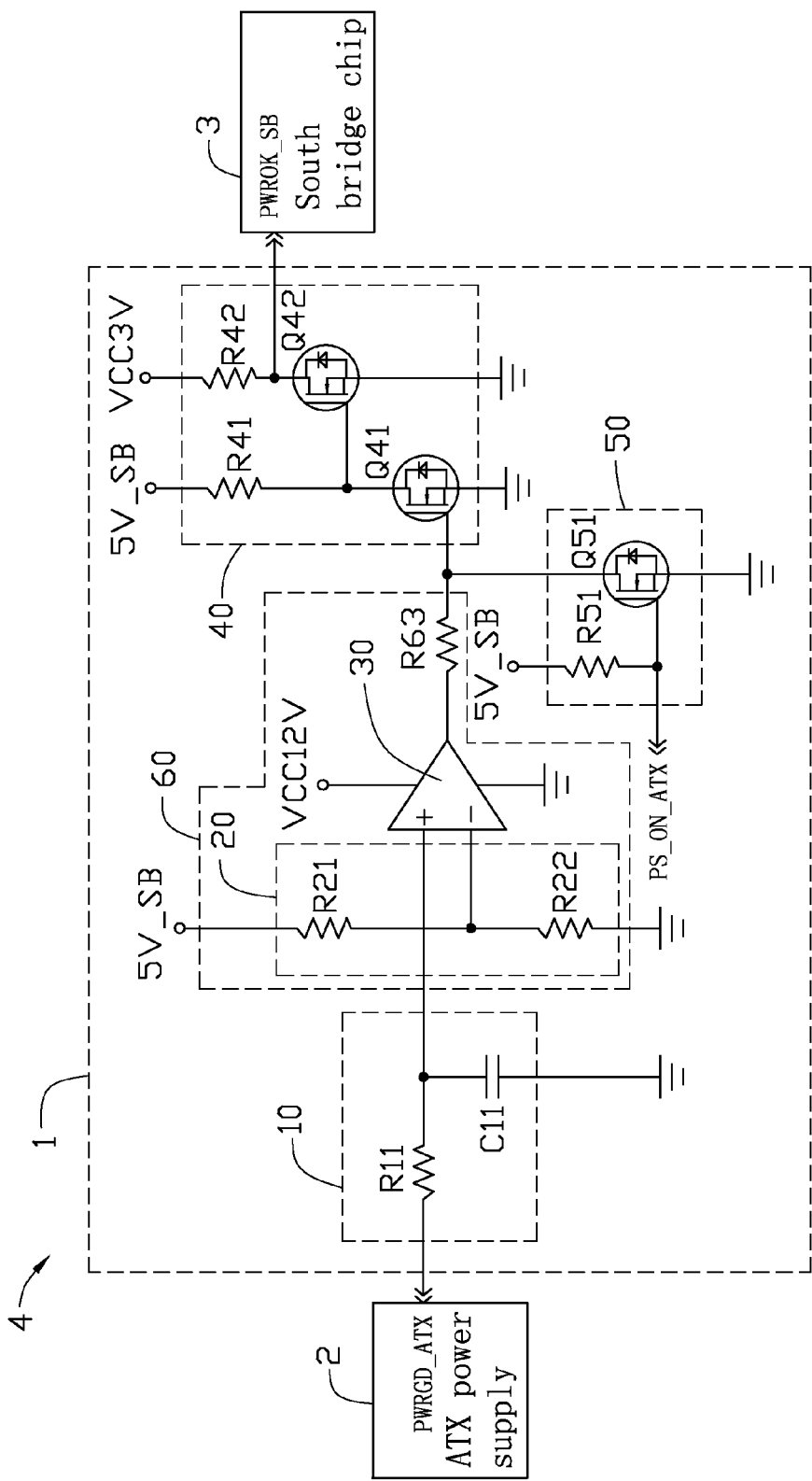
FIG. 1 is a circuit diagram of an embodiment of a computer system.
Figure 2:
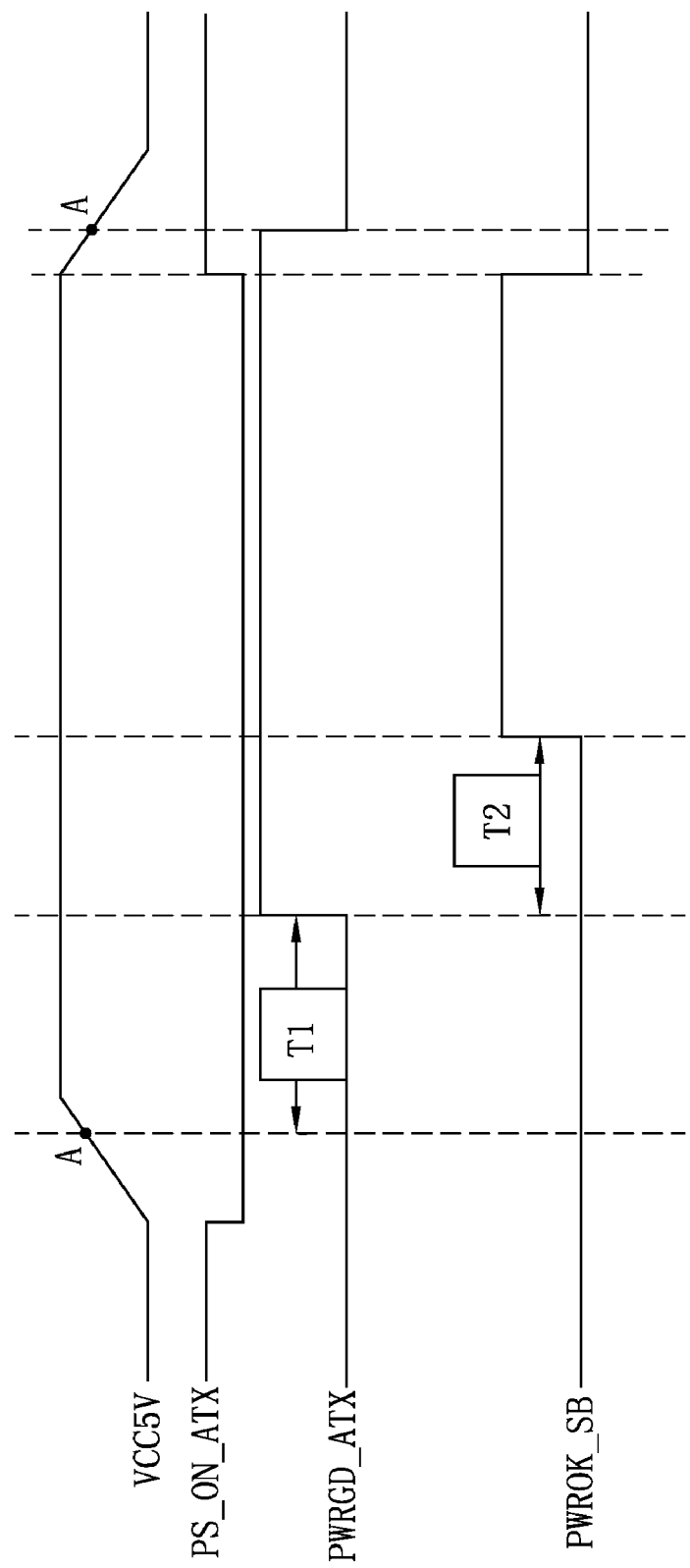
FIG. 2 is a timing diagram of the computer system of FIG. 1.

Referring to FIGS. 1 and 2, an embodiment of a computer system 4 includes a timing control circuit 1, an advanced technology extended (ATX) power supply 2, and a south bridge chip 3. The timing control circuit 1 is configured for controlling operation sequence of the computer system 4. The timing control circuit 1 includes a delay module 10, a processing module 60, a two-stage voltage level switching module 40, and a controlling module 50. The processing module 60 includes a reference voltage generating module 20 and a comparator 30.

The delay module 10 includes a resistor R11 and a capacitor C11. A first end of the resistor R11 functions as an input of the delay module 10, and receives a power good signal PWRGD_ATX of the ATX power supply. A second end of the resistor R11 is connected to a first end of the capacitor C11. A second end of the capacitor C11 is grounded. A node between the resistor R11 and the capacitor C11 functions as an output of the delay module 10. In one embodiment, the ATX power supply 2 is configured to provide necessary voltages to the whole computer system 4, such as a 3-volt system voltage VCC3V, a 5-volt system voltage VCC5V, and a 12-volt system voltage VCC12V. The power good signal PWRGD_ATX is effective in response to being at a transistor-transistor logic (TTL) high level, such as a logical 1, indicating that voltage values of the necessary voltages provided to the computer system 4 from the ATX power supply 2 are greater than rated values of the necessary voltages. It may be understood that when the power good signal PWRGD_ATX is at a TTL high level, the power good signal PWRGD_ATX is an effective signal which indicates that the necessary voltages are ready. In contrast, the power good signal PWRGD_ATX is de-asserted (to be ineffective) to a low state when any of the necessary voltages is unready, and the computer system cannot work.

The reference voltage generating module 20 includes resistors R21 and R22. A first end of the resistor R21 is connected to a standby power supply 5V_SB of the computer system 4. A second end of the resistor R21 is grounded via the resistor R22, and is connected to an inverting input of the comparator 30. A non-inverting input of the comparator 30 functions as an input of the processing module 60, and is connected to the output of the delay module 10. A power terminal of the comparator 30 is connected to the 12-volt system voltage VCC12V. A ground terminal of the comparator is grounded. The processing module 60 further includes a resistor R63. A first end of the resistor R63 is connected to an output of the comparator 30. A second end of the resistor R63 functions as an output of the processing module 60, and is connected to an input of the two-stage voltage level switching module 40.

The two-stage voltage level switching module 40 includes electronic switches Q41, Q42, and resistors R41, R42. A first terminal of the electronic switch Q41 functions as the input of the two-stage voltage level switching module 40. A second terminal of the electronic switch Q41 is connected to a first terminal of the electronic switch Q42. A second terminal of the electronic switch Q42 functions as an output of the two-stage voltage level switching module 40, and is connected to the south bridge chip 3 to output a power good signal PWROK_SB. A first end of the resistor R41 is connected to the standby power supply 5V_SB. A second end of the resistor R41 is connected to the second terminal of the electronic switch Q41. A first end of the resistor R2 is connected to the second terminal of the electronic switch Q42. A second end of the resistor R2 is connected to the 3-volt system voltage VCC3V. A third terminal of each of the electronic switches Q41 and Q42 is grounded.

The controlling module 50 includes an electronic switch Q51 and a resistor R51. A first terminal of the electronic switch Q51 is configured to receive a power supply on signal PS_ON_ATX from a motherboard of the computer system 4. A second terminal of the electronic switch Q51 is connected to the input of the two-stage voltage level switching module 40. A third terminal of the electronic switch Q51 is grounded. A first end of the resistor R51 is connected to the standby power supply 5V_SB. A second end of the resistor R51 is connected to the first terminal of the electronic switch Q51.

In one embodiment, each of the electronic switches Q41, Q42, and Q51 is an N-channel metal oxide semiconductor field effect transistor (MOSFET), which includes a gate, a drain, and a source. The first, second, and third terminals of each of the electronic switches Q41, Q42 and Q51 are the gate, drain, and source correspondingly. The power supply on signal PS_ON_ATX is configured to power the computer system 4 on in response to being triggered to be at a TTL low level, such as a logical 0, and power the computer system 4 off in response to being triggered to be at a TTL high level, such as a logical 1.

The delay module 10 is configured to delay the power good signal PWRGD_ATX of the ATX power supply 2. The processing module 60 is configured to receive the delayed power good signal PWRGD_ATX, and output a TTL level signal according to the power good signal PWRGD_ATX. The power good signal PWROK_SB is provided to the south bridge chip 3 by the two-stage voltage level switching module 40. The power good signal PWROK_SB is at a same voltage level as the TTL level signal in response to the computer system 4 being on. The power good signal PWROK_SB is effective in response to being at a TTL high level, indicating that necessary input powers of the south bridge chip 3 are ready to work, and the computer system 4 is ready to be started.

When the computer system 4 is off with enabled wake, the standby power supply 5V_SB outputs a 5-volt standby voltage, and the 12-volt system voltage VCC12V is no-output. The comparator 30 does not work, and outputs no signal. The electronic switch Q41 is off. The electronic switch Q42 is on. The power good signal PWROK_SB is at a TTL low level, and is ineffective.

When the computer system 4 is powered on, the power supply on signal PS_ON_ATX is triggered to be at a TTL low level. The electronic switch Q51 is off. Voltages of the 12-volt system voltage VCC12V rise from 0 volts. The comparator 30 works in response to voltages of the 12-volt system voltage VCC12V achieving a rated voltage as specified by the ATX specification. The power good signal PWRGD_ATX is at a TTL low level until a time of 500-600 ms being delayed after voltages of the 5-volt system voltage VCC5V achieving a rated value as specified by the ATX specification. A reference voltage is provided to the inverting input of the comparator 30 by dividing the 5-volt standby voltage by the resisters R21 and R22. The TTL level signal, which is at a low level, is output by the comparator 30. The electronic switch Q41 is turned off. The electronic switch Q42 is turned on. Therefore, the power good signal PWROK_SB is at a TTL low level.

The power good signal PWRGD_ATX is at a TTL high level in response to the voltages of the 5-volt system voltage VCC5V achieving the rated value for 500-600 ms. The power good signal PWRGD_ATX is received by the non-inverting input of the comparator 30 after being delayed a predetermined time by the delay module 10. The voltage at the non-inverting input of the comparator 30 becomes greater than the voltage at the inverting input of the comparator 30. The TTL level signal outputted by the comparator 30 is at a high level. The electronic switch Q41 is turned on. The electronic switch Q42 is turned off. Therefore, the power good signal PWROK_SB is at a TTL high level.

The power supply on signal PS_ON_ATX is immediately triggered to be at a TTL high level in response to the computer system 4 being turned off. The electronic switch Q51 is turned on. The electronic switch Q41 is turned off. The electronic switch Q42 is turned on. The power good signal PWROK_SB is switched to be at a TTL low level immediately.

Power supply timing of the computer system 4 is shown in FIG. 2. In this diagram, "A" denotes the rated value of the 5-volt system voltage VCC5V. Voltages of the 5-volt system voltage VCC5V rise from 0 volts in response to the power supply on signal PS_ON_ATX being triggered to become at a TTL low level. The power good signal PWRGD_ATX is effective after the voltages of the 5-volt system voltage VCC5V achieve the rated value. There is a time delay T1 between the power good signal PWRGD_ATX being effective and the voltages of the 5-volt system voltage VCC5V achieving the rated value. The power good signal PWROK_SB is delayed a time T2 to be effective after the power good signal PWRGD_ATX becomes effective. In one embodiment, the time delay T1 is between 500-600 ms. The time T2, which functions as the predetermined time, is equal to or greater than 100 ms. The value of the time T2 is predetermined by setting parameters of the delay module 10, such as resistance of the resistor R11 and capacitance of the capacitor C11.

Voltages of the 5-volt system voltage VCC5V are reduced in response to the power supply on signal PS_ON_ATX being triggered to become a TTL high level from a TTL low level. The power good signals PWROK_SB and PWRGD_ATX become at TTL low levels in response to the power supply on signal PS_ON_ATX being triggered to become the TTL high level. There is no delay between the power supply on signal PS_ON_ATX being triggered to be high and the power good signal PWROK_SB being ineffective. Therefore, the south bridge chip 3 stops working immediately. There is a time delay between the power good signal PWRGD_ATX being triggered to be low and voltages of the 5-volt system voltage VCC5V being below the rated value.

Figure 3:
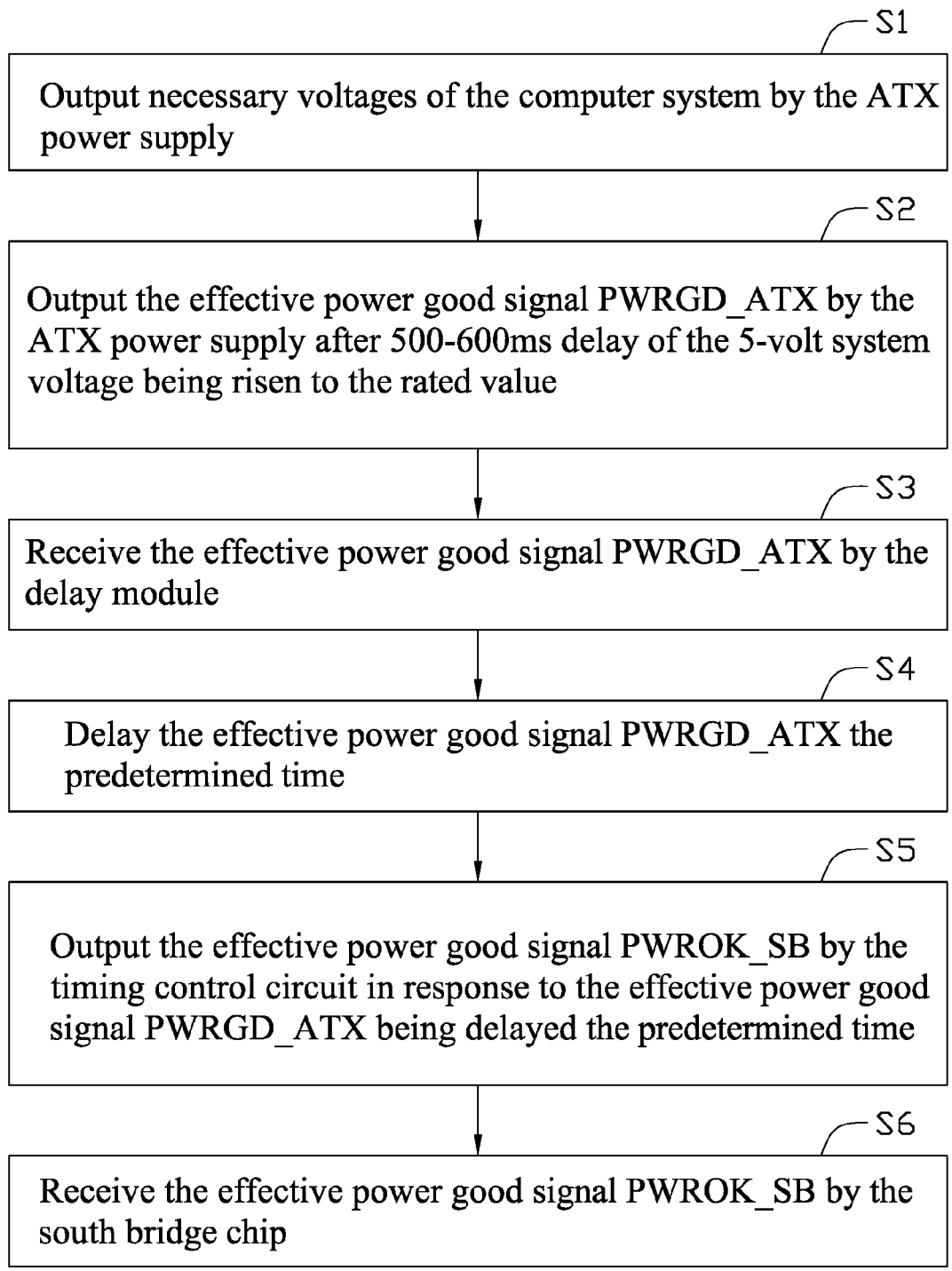
FIG. 3 is a flowchart of an embodiment of an operating method of the computer system of FIG. 1.

Referring to FIG. 3, an embodiment of an operating method of the computer system 4 of FIG. 1 includes the following steps.

In step 1, the ATX power supply 2 outputs the necessary voltages of the computer system.

In step S2, the ATX power supply 2 outputs the effective power good signal PWRGD_ATX after a 500-600 ms delay after voltages of the 5-volt system voltage VCC5V rise to the rated value. The effective power good signal PWRGD_ATX indicates the necessary voltages of the computer system 4 are ready.

In step S3, the delay module 10 of the timing control circuit 1 receives the effective power good signal PWRGD_ATX.

In step S4, the delay module 10 delays the effective power good signal PWRGD_ATX for the predetermined time.

In step S5, the timing control circuit 1 outputs the effective power good signal PWROK_SB after the effective power good signal PWRGD_ATX being delayed for the predetermined time.

In step S6, the south bridge chip 3 receives the effective power good signal PWROK_SB.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:
1. A computer system, comprising:
 a power supply to output necessary voltages and a first power good signal to the computer system, the necessary voltages comprising a first system voltage, the first power good signal being delayed for a first time to be effective after voltages of the first system voltage being risen to a rated value;

a south bridge chip; and a timing control circuit comprising a delay module to receive and delay the first power good signal;

wherein the timing control circuit is operable to generate a second power good signal to the south bridge chip according to the first power good signal, the second power good signal is generated after the first power good signal being delayed for a second time by the delay module, the first power good signal indicating that the necessary voltages provided to the computer system are ready in response to being effective, the second power good signal indicating that necessary input powers of the south bridge chip are ready in response to being effective; the timing control circuit further comprises a processing module and a two-stage voltage level switching module, the processing module is connected to the delay module to output a transistor-transistor logic (TTL) level signal according to the first power good signal delayed by the delay module, the two-stage voltage level switching module receives the TTL level signal and outputs the second power good signal, the second power good signal is at a same TTL level as the TTL level signal in response to the computer system not being triggered off.

2. The computer system of claim 1, wherein the second time is equal to or greater than 100 ms.

3. The computer system of claim 1, wherein the processing module comprises a first resistor, a reference voltage generating module comprising a second resistor and a third resistor, and a comparator, a first end of the second resistor is connected to a standby power supply of the computer system, a second end of the second resistor is connected to an inverting input of the comparator, a first end of the third resistor is connected to the second end of the second resistor, a second end of the third resistor is grounded, a non-inverting input of the comparator is connected to the delay module, an output of the comparator is connected to a first end of the first resistor, a second end of the first resistor functions as an output of the processing module to output the TTL level signal, the TTL level signal is at a TTL low level in response to the computer system being off with enabled wake or the computer system being powered on before the necessary voltages being ready, the TTL level signal is at a TTL high level in response to the first power good signal is delayed for the first time.

4. The computer system of claim 3, wherein the two-stage voltage level switching module comprises a first electronic switch, a second electronic switch, a fourth resistor, and a fifth resistor, a first terminal of the first electronic switch is to receive the TTL level signal from the processing module, a second terminal of the first electronic switch is connected to a first terminal of the second electronic switch, a second terminal of the second electronic switch is configured to output the second power good signal, a first end of the fourth resistor is connected to the standby power supply, a second end of the fourth resistor is connected to the second terminal of the first electronic switch, the necessary voltages further comprises a second system voltage received by a first end of the fifth resistor, a second end of the fifth resistor is connected to the second terminal of the second electronic switch, a third terminal of each of the first and second switches is grounded; the first electronic switch is turned off and the second electronic switch is turned on in response to the TTL level signal being at a low level; the first electronic switch is turned on and the second electronic switch is turned off in response to the TTL level signal being at a high level.

5. The computer system of claim 4, wherein the timing control circuit further comprises a control module comprising a third electronic switch and a sixth resistor, a first terminal of the third electronic switch is configured to receive a power supply on signal of the computer system and connected to the standby power supply via the sixth resistor, a second terminal of the third electronic switch is connected to the first terminal of the first electronic switch, a third terminal of the third electronic switch is grounded, the third electronic switch is turned on to switch off the first electronic switch in response to the computer system being triggered off by the power supply on signal, and the second power good signal is switched to be at a low level.

6. The computer system of claim 5, wherein each of the first, second, and third electronic switches is an N-channel metal oxide semiconductor field effect transistor comprising a gain functioning as the first terminal, a drain functioning as the second terminal, and a source functioning as the third terminal correspondingly.

7. The computer system of claim 4, wherein the first system voltage is a 5-volt system voltage, the second system voltage is a 3-volt system voltage.

8. The computer system of claim 1, wherein the delay module comprises a resistor and a capacitor, a first end of the resistor is configured to receive the first power good signal, a second end of the resistor is configured to output the delayed first power good signal, a first end of the capacitor is connected to the second end of the resistor, a second end of the capacitor is grounded.

9. A computer system, comprising:

a power supply to output a first system voltage to the computer system and an effective first power good signal after voltages of the first system voltage being risen to a rated value;

a timing control circuit comprising a delay module, and to output an effective second power good signal after receiving and processing the effective first power good signal; and a south bridge chip to receive the effective second power good signal;

wherein there is a first time delay between outputting the effective first power good signal and voltages of the first system voltage being risen to the rated value, there is a second time delay between receiving the first effective power good signal by the timing control circuit and outputting the effective second power good signal, the second time delay is generated by receiving and delaying the effective first power good signal by the delay module; the timing control circuit further comprises a processing module and a two-stage voltage level switching module, the processing module is connected to the delay module to output a transistor-transistor logic (TTL) level signal according to the first power good signal delayed by the delay module, the two-stage voltage level switching module receives the TTL level signal and outputs the second power good signal, the second power good signal is at a same TTL level as the TTL level signal in response to the computer system not being triggered off.

10. The computer system of claim 9, wherein the second time delay is equal to or greater than 100 ms.

11. An operation method of a computer system, comprising:

outputting necessary voltages of the computer system by a power supply, wherein the necessary voltages comprise a system voltage;

outputting an effective first power good signal by the power supply after a time delay of voltages of the system voltage being risen to a rated value, indicating the necessary voltages of the computer system are ready;

receiving the effective first power good signal by a delay module of a timing control circuit;

delaying the effective first power good signal for a predetermined time by the delay module;

outputting an effective second power good signal by the timing control circuit in response to the effective first power good signal being delayed for the predetermined time; and receiving the effective second power good signal by a south bridge chip, wherein the effective second power good signal enables the south bridge chip to work, and the timing control circuit further comprises a processing module and a two-stage voltage level switching module, the processing module is connected to the delay module to output a transistor-transistor logic (TTL) level signal according to the first power good signal delayed by the delay module, the two-stage voltage level switching module receives the TTL level signal and outputs the second power good signal, the second power good signal is at a same TTL level as the TTL level signal in response to the computer system not being triggered off.

12. The method of claim 11, wherein the predetermined time is equal to or greater than 100 ms.

* * * * *